United States Patent [19]

Augustine et al.

[11] Patent Number: 5,078,881

[45] Date of Patent: Jan. 7, 1992

[54] DECONTAMINATION PROCESS

[75] Inventors: Margret Augustine, Oracle; Carl N. Hodges, Tucson; Linda S. Leigh, Oracle, all of Ariz.

[73] Assignee: Space Biospheres Venture, Oracle, Ariz.

[21] Appl. No.: 430,801

[22] Filed: Nov. 2, 1989

[51] Int. Cl.⁵ ............................................... C02F 3/32
[52] U.S. Cl. ................................. 210/602; 210/603; 210/614; 210/618; 210/631; 210/909; 55/68
[58] Field of Search ............. 210/602, 603, 614, 617, 210/618, 620, 631, 908, 909; 55/68–73, 312

[56] References Cited

U.S. PATENT DOCUMENTS

| | | | | |
|---|---|---|---|---|
| 4,201,663 | 5/1980 | Rollag et al. | | 55/73 |
| 4,302,236 | 11/1981 | Roman | | 55/73 |
| 4,421,534 | 12/1983 | Walker | | 210/617 |
| 4,882,058 | 11/1989 | Burton | | 210/617 |
| 4,959,084 | 9/1990 | Wolverton et al. | | 55/68 |
| 4,961,763 | 10/1990 | Thompson et al. | | 55/312 |

*Primary Examiner*—Thomas Wyse
*Attorney, Agent, or Firm*—Christie, Parker & Hale

[57] ABSTRACT

Solutions containing pesticide wastes from greenhouses, for example, are decontaminated in a system including a soil bed reactor. Waste water from the greenhouse goes to a sample tank from which samples are withdrawn for assay of toxicity. Water from the sample tank goes to a holding tank, or to a downstream subsystem if toxicity level is low. Water in the holding tank is aerated to promote degradation of toxic materials. Water from the holding tank is applied near the upper surface of a layer of soil in the soil bed reactor. Air from the sample tank and holding tank, and intermittently, air containing pesticides from the greenhouse, is also passed through the layer of soil in the soil bed reactor. Microbial action in the soil degrades toxic materials in both the gaseous and liquid streams. Water from the soil bed reactor may then be discharged to a pond populated by plant and animal species which promote further degradation of any remaining toxic materials before the water is discharged from the system. A bioassay technique employing aquatic amphipods sensitive to water borne toxic materials is provided for routine screening of toxicity levels in the various solutions in the system.

16 Claims, 1 Drawing Sheet

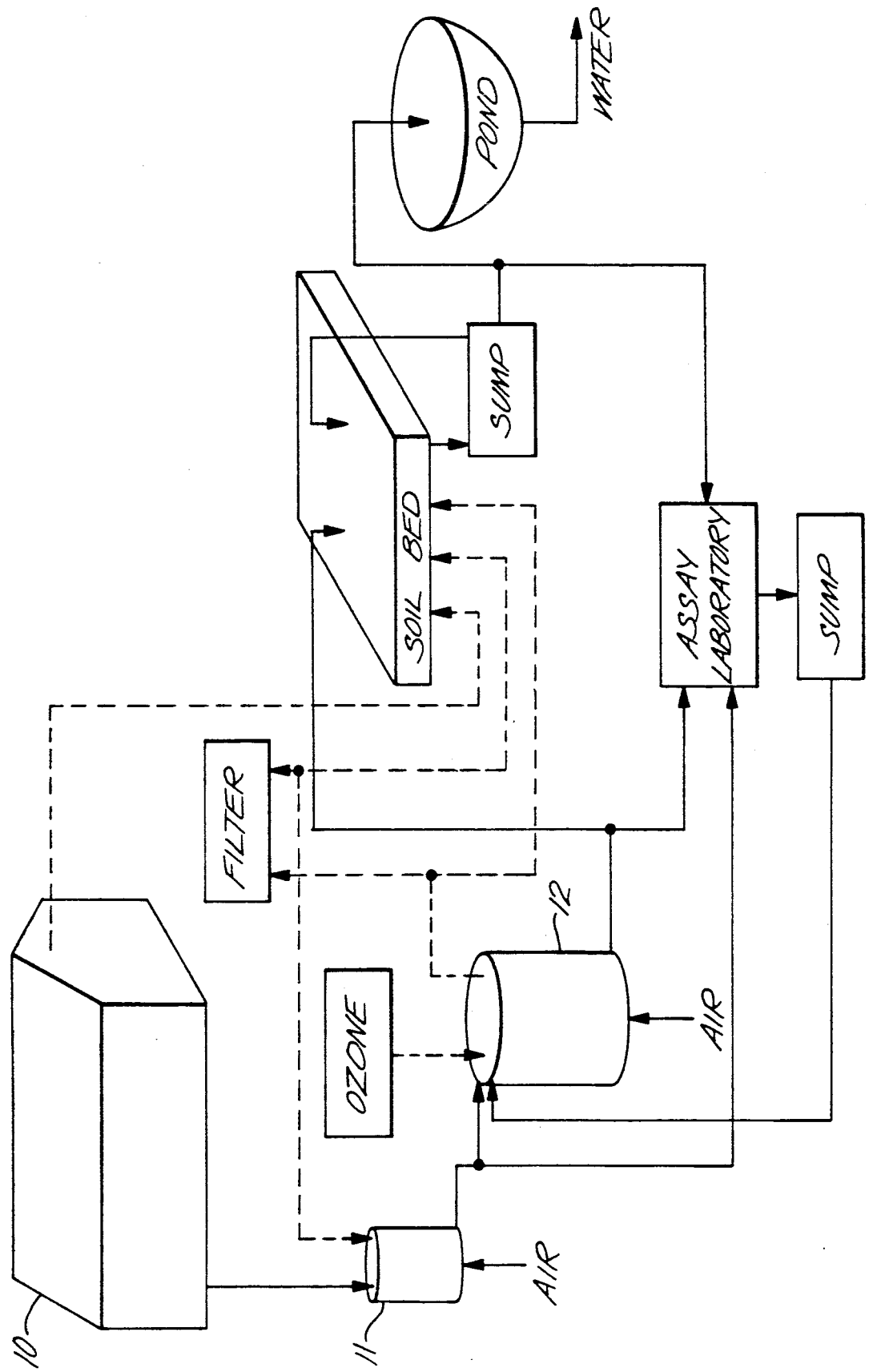

DECONTAMINATION PROCESS

FIELD OF THE INVENTION

This invention relates to detoxification of dilute solutions and air which may contain toxic substances such as pesticide residues or the like. In particular it is suitable for use in decontaminating rinse water and air from a greenhouse which has been fumigated or treated with pesticides.

BACKGROUND OF THE INVENTION

A great concern has developed about release of toxic substances such as pesticides into the environment. Pesticides are of great importance for agriculture, but are hazardous and must often be disposed of in a manner that is environmentally acceptable.

An example is for greenhouses. A variety of plant species are grown in greenhouses where temperature and humidity may be controlled and the plants protected from environmental stresses. A variety of pesticides may be required for maintaining the health and vigor of the plants and preventing their destruction from any of a broad variety of organisms which may be damaging to the species being cultured. It is, therefore, not uncommon to introduce pesticides into a greenhouse by spraying the soil or foliage, or in gaseous form as a fumigant.

Since a greenhouse may remain relatively closed, the pesticides may persist and become a hazard to greenhouse workers. It may, therefore, be desirable to rinse floors, plants and other surfaces in the greenhouse to not only remove pesticides, but also to do the general clean up of leaves, twigs and the like which accumulate in a greenhouse. The water used for rinsing may often contain appreciable amounts of toxic material which should not be discharged into the open environment or ordinary waste disposal systems. Such rinse waters form dilute solutions of pesticides which are troublesome to dispose of. It is sometimes straightforward to substantially reduce toxicant concentration from a strong solution, as compared with the difficulty of removing relatively small amounts of contaminating toxicants from large volumes of dilute solution.

Further, when a greenhouse is fumigated it is eventually necessary to withdraw the toxicant laden air from the greenhouse. Thus, for example, a greenhouse may be fumigated in the evening and the fumigant permitted to remain through most of the night. Air circulation may be required, however, during the day to prevent the sun from overheating the greenhouse. It is desirable to prevent such air circulation from discharging toxic fumigants into the open environment.

Greenhouses are just one example of situations where fumigants or other pesticides may need to be disposed of. For example, food storage warehouses, transportation containers or truck trailers may from time to time require fumigation or similar treatment. Greenhouses, however, provide a good example for exposition of this invention. There are also a large number of greenhouses, each of which may discharge small amounts of toxic waste. Collectively these may have a substantial impact on the environment.

Such greenhouses may be relatively small scale operations so that costly waste treatment facilities would be uneconomic. It is, therefore, desirable to provide an inexpensive and ecologically safe alternative for present waste disposal systems, or more significantly to provide a waste disposal system where none may be presently employed.

It is desirable that the system be such that it can be readily scaled to the required size of the operation. Thus, for example, it is desirable that such a system be adaptable for use on a single greenhouse or for servicing a substantial number of large greenhouses occupying large plots of land. It is desirable that the decontamination system handle toxic wastes on site so that there is no need for transporting the wastes to remote locations. By completely degrading toxic byproducts on site, it is not necessary to export the problem elsewhere.

It is also desirable that the system be capable of handling both liquid and gaseous wastes so that, for example, the rinse water from a greenhouse and the fumigant withdrawn when air circulation is resumed may both be disposed of in the same system.

It is desirable to avoid "high tech" solutions which require great care in operation to assure continued satisfactory removal of toxicants. It is also desirable that the system be operable for removing a variety of toxic materials. This may be important since different pesticides are employed, depending on the season and stage of growth of various plant species and the types of pests that may adversely infest them.

BRIEF SUMMARY OF THE INVENTION

There is therefore provided in practice of this invention according to a presently preferred embodiment a technique for decontaminating effluents from a greenhouse or the like. An element of the system is a soil bed reactor which comprises a layer of permeable soil having means for introducing or discharging fluid from the bottom of the layer so that gas or liquid may be conveyed upwardly or downwardly through the layer of soil. Air withdrawn from the greenhouse which may, for example, contain toxic materials following fumigation is passed through the layer of soil in the soil bed reactor for microbial degradation of organic material in the air. Likewise means are provided for passing liquid through the soil bed reactor for microbial degradation of organic material in the liquid.

Since the rinse liquid may be discharged from the greenhouse over a short period of time, a holding tank may be used for temporarily storing the liquid effluent for gradual introduction into the soil bed reactor. It is desirable to employ a sample tank ahead of the holding tank so that rinse liquid may be assayed for the presence of toxic wastes and directed to a holding tank or to the soil bed reactor or to waste water discharge, depending on the level of toxic materials in the particular batch of effluent.

Further, it may be desirable to discharge water from the soil bed reactor into an open pond populated with various plant and animal species to assure full degradation of toxic materials before the water is discharged into a leach field or other means for disposing of the waste water.

BRIEF DESCRIPTION OF THE DRAWINGS

These and other features and advantages of the present invention will be appreciated as the same becomes better understood by reference to the following detailed description when considered in connection with the accompanying drawing which comprises a schematic or block diagram of a decontamination system constructed according to principles of this invention.

DETAILED DESCRIPTION

The general layout of a system as provided in practice of this invention is indicated in the accompanying drawing. In this schematic illustration there is a single greenhouse 10, a single sample tank 11, etc. It will be understood that such a system may be employed with a plurality of greenhouses or that one sample tank may be used for two or three greenhouses, for example. Scaling the system for other magnitudes of usage may be easily accomplished by those skilled in the art. Thus, it is to be understood that the description is of an exemplary embodiment for enabling those skilled in the art to make and use the invention. There is nothing unremarkable about a greenhouse, and in fact this invention may be employed in other applications where dilute solutions of toxic materials may be generated.

To give an idea of scale, an exemplary embodiment has four greenhouses, each having an area of about 70 square meters and an internal volume of about 520 cubic meters. A broad variety of plant species, including rather large trees, may be cultivated in such greenhouses.

The plants and soil in the greenhouse may be treated with a broad variety of compounds, which are preferably of a variety that are normally degraded in the environment within a couple of weeks. The types of materials that may be used may combat pests such as foliage feeding insects and larvae, soil inhabiting worms and nematodes, pathogenic fungi, and the like. Some substances may be used for disinfecting or sterilizing equipment facilities or soils. Although not likely, phytotoxic materials may on occasion be employed. Just for example, pesticides or herbicides that might be used in a greenhouse could include Dichlorvos, Naled, metham-sodium (Vapam), cypermethrin, permethrin, phosphine, iodophors, calcium hypochlorite, and calcium hydroxide. Such substances may be present in solid, liquid or gaseous form. At times somewhat noxious carriers, wetting agents and other adjuvants may be employed.

Generally speaking, such substances are applied in gaseous form as a fumigant or as a liquid spray, typically in dilute solute. As explained hereinafter, following fumigation air from the greenhouse is withdrawn and detoxified instead of being released into the environment. The solid and liquid pesticides are not as fugitive and tend to remain in the greenhouse. There are many times, however, when it is desirable to rinse plant surfaces, soils, windows, bench tops and floors either for the specific purpose of removing pesticides or for general cleanup in the greenhouse.

Typically, pesticides may be applied once a week, and following application bench tops and floors are rinsed for removing pesticide residues. Greenhouses are typically rinsed bi-weekly or oftener as may be required, regardless of whether pesticides have been applied. The liquid waste from rinsing drains by gravity through floor drains or the like to a sample tank 11. Fine sprays are typically used for rinsing so that maximum cleaning may be obtained with a minimum amount of water. Thus a 400 liter sample tank should be sufficient for all rinsings of a greenhouse of the size mentioned above. In fact, such a sample tank should be sufficient for two greenhouses or, if preferred, each may have its own sample tank.

The sample tank is fitted with a screen basket (not shown) at its inlet for trapping debris swept through the floor drains during rinsing. A 0.8 millimeter screen opening in the basket keeps all but the finest debris out of the sample tank. Each sample tank is also provided with an air inlet for introduction of compressed air. While there is liquid in the tank, air is sparged into the liquid for mixing and enhancing degradation of toxic materials in the liquid.

The purpose of the storage tank is to allow for temporary storage of rinse water or the like produced within the greenhouse while the relative toxicity level of the effluent can be ascertained by analytical or bioassay techniques. A sample may be withdrawn from the liquid in the sample tank and transferred to an assay laboratory for such measurements. A pump (not shown) conveys liquid from the sample tank to the assay laboratory where a sample may be manually withdrawn. In a small operation, hand sampling of liquid in the sample tank is sufficient. Depending on the toxicity level determined by assay, the effluent from the sample tank may be conveyed to any of the downstream decontamination subsystems as appropriate for the toxicity level of the batch of effluent in the tank.

It will be recognized that in the schematic illustration a variety of pumps, valves, level controls and other safety and fluid handling devices are omitted for clarity. Suitable "plumbing" may be readily provided by those skilled in the art. Control of the various pumps, valves and the like may be manual or by a computerized linkage which assures that appropriate valves are open or closed as required to effect a desired transfer of liquid.

Once the relative toxicity level of the contents of the storage tank has been established, the liquid may be transferred to the appropriate downstream unit. After transfer the sample tank is rinsed with fresh water for minimizing the likelihood of one batch of pesticide affecting the results of analyses on subsequent batches. A spray head (not shown) is permanently mounted in the sample tank for ease of cleaning.

Assuming that there is an appreciable toxicity level of liquid in the sample tank, its contents are transferred to a holding tank 12. A 3,800 liter holding tank has been found to be sufficient. Two or more such tanks or larger tanks may be used as appropriate. The volume of the holding tank is sufficient for comingling about ten batches of liquid from the sample tank. The holding tank is supplied with a constant source of compressed air introduced by way of an air stone or other sparging device at the bottom of the tank. This provides aeration for mixing and enhanced degradation of toxic materials in the liquid in the tank. In addition, the flowing air tends to strip volatile toxic materials from waste water in the tank. As pointed out hereinafter, toxic materials in the air stream from the holding tank are degraded in a soil bed reactor instead of being discharged into the environment.

Means are provided for withdrawing samples of liquid from the holding tank and conveying them to the assay laboratory so that the toxicity level of liquid in the holding tank may be ascertained from time to time. If desired, the holding tank may be provided with growth lights or may be maintained at elevated temperature to accelerate the degradation process. Acids, alkalies, or oxidizing agents may be added as desired for adjusting pH or otherwise enhancing degradation. Samples may be taken for assay every week or two, or shortly after another batch of effluent has been added from the sample tank.

It may be desirable to employ parallel holding tanks with one of them employed for receiving liquid from a sample tank which has a relatively high level of toxicity and the other for receiving liquid which has a relatively lower toxicity level. This permits liquid with lower toxicity to bypass some downstream units without discharging toxic materials from the system.

Liquid from the holding tank or tanks which contains toxic material may be transferred to a soil bed reactor. A typical soil bed reactor comprises an open waterproof basin which contains a layer of soil about one meter deep. A freeboard of about ten centimeters above the soil level is sufficient for the basin. A typical soil bed reactor may have an area of about four meters by four meters.

The layer of soil rests on an array of permeable concrete blocks arranged for even distribution of air beneath the layer of soil. An exemplary layer of soil may comprise about 40% sand, 30% peat, and 30% chipped bark. Such a soil mixture provides an excellent medium for sustenance of soil microorganisms and has relatively high permeability.

One or more such soil bed reactors may be completely enclosed within a structure with transparent roofs and sides. Double-layered walls and roof may be used for thermal insulation.

Liquid from the holding tank (or in some circumstances from a sample tank) is applied to the upper portion of the layer of soil by a conventional drip irrigation network of tubing. The liquid may be introduced on top of the layer of soil or the drip irrigation system may be buried a few centimeters below the surface so that liquid is introduced below the surface. The quantity of liquid from the holding tank delivered to the soil bed reactor may be varied from time to time as determined by the pH, temperature, moisture level in the soil, and desired flow rate through the layer of soil. The rate of application of liquid to the soil bed reactor is kept low enough that air may also be passed through the soil bed reactor. Toward that end larger areas of soil bed reactor may be employed as desired to keep the layer of soil permeable.

The soil bed reactor contains a local recirculation system (not shown). Any liquid that moves completely through the layer of soil passes to a sump from which samples may be withdrawn to the assay laboratory to determine toxicity levels. Liquid from the sump may be recirculated to pass through the layer of soil again or may be transferred to a pond for final "polishing". Alternatively liquid from the sump of a first soil bed reactor may be transferred to a second soil bed reactor for further degradation of toxic materials in the liquid.

Air from each of the sample tank and the holding tank is withdrawn by a vent line and conveyed to the soil bed reactor. After the greenhouse has been fumigated, air which contains residual pesticide is withdrawn from the greenhouse by a blower (not shown) and conveyed to the soil bed reactor. During venting of the greenhouse the vents from the sample and holding tanks are diverted from the soil bed reactor to an activated charcoal filter, or the like, for removal of any toxic material before discharge of the air. The filter may include a layer of alumina supporting potassium permanganate for oxidizing toxic materials.

Air from the sample tank, holding tank and/or greenhouse is passed through the layer of soil in the soil bed reactor. The air may be introduced through the network of concrete blocks in the bottom of the soil bed reactor and flow upwardly through the layer of soil. This direction of flow tends to minimize drying of the upper level of the layer of soil and presence of airborne toxic materials within the enclosure for the soil bed reactor. On the other hand, toxic materials in the liquid being added to the soil bed reactor may be swept into the enclosure by an upward flow of air. Introduction of effluent liquid by a buried drip irrigation system below the surface of the layer of soil tends to minimize this effect.

Alternatively the air may be passed downwardly through the layer of soil concurrent with the liquid flow.

Upward flow of air through the layer of soil is desirable since there will be times during the summer and periods of solar heating that it is desirable to have windows in the enclosure for the soil bed reactor left open to avoid overheating. This is compatible with introduction of air which may contain toxicants below the soil bed and discharge of air which is substantially free of toxic materials. It is desirable to have screens on the windows of the enclosure to minimize introduction of undesired plant or animal species.

A maximum exemplary air flow rate is in the order of 30 liters per minute per cubic meter of soil. A lower flow rate may be employed for lower pressure drop or longer residence time in the layer of soil. The flow rate may be appreciably lower when only the tanks are being vented.

The soil bed reactor contains microorganisms which utilize as nutrients the organic materials employed as pesticides. The soil bed also provides a large moist surface area on which organic materials may be adsorbed for gradual oxidation or digestion. Pesticides are ordinarily degraded by oxidation and microbiological activity, and the soil bed reactor provides conditions which significantly accelerate the normal rate of degradation. Thus, toxic materials in the air and water from the greenhouse are rapidly degraded in the decontamination system, both in the holding tank and in the soil bed reactor.

The microorganisms in the soil may be indigenous to the soil, or may be inoculated into the soil at the time the layer is placed in the basin or at such later times as new colonies of microorganisms may seem to be needed. In any event, it is found that the culture of microorganisms in the soil changes to best take advantage of the nutrients available in the wastes applied to the soil. Thus, there is a natural adaptation of the microorganisms which promotes rapid degradation of the waste streams commonly encountered.

To maintain appropriate growth conditions for microorganisms in the layer of soil, fertilizers and other nutrients may be occasionally added. Spent activated carbon from the filter, organic wastes from the assay laboratory, and contaminated solid waste such as twigs, leaves and spilled soil from the greenhouse may be incorporated into the soil in the soil bed reactor for decay and detoxification.

It is also desirable to cultivate a photosynthetic crop on the layer of soil. The crop may itself contribute to accelerated degradation of pesticides and helps maintain soil quality without tillage. Transpiration from the crop also increases the effluent handling capacity of the soil bed reactor. The Lew variety of alfalfa is an excellent crop which can be maintained for several years with little maintenance. Occasional mowing is all that is needed.

The final stage of the decontamination system is a polishing pond which may typically have a volume about the same as that of the holding tank or tanks. The pond is an open waterproof basin which may include a transparent canopy for minimizing rain water additions to the pond. Evaporation from the surface of the pond and from the soil bed reactor disposes of a major portion of the liquid effluent from the greenhouse and only minimal quantities need to be discharged for agricultural use or disposal in a conventional leach field or other water disposal system.

The pond not only disposes of a substantial amount of water, but also further improves the water quality in the event there are traces of pesticides remaining after the soil bed reactor. The pond is designed with overhangs, crevices and the like to allow for stocking with populations of various plant and animal species such as fish (koi), crustaceans (cray fish), amphibians (frogs) and various floating and submerged plants, as well as insects and the like indigenous to the area. These organisms plus various microbial species residing in the pond, assure final degradation of any traces of pesticides remaining in the discharged water.

If desired, a conventional ozonation unit may be included in the system for introducing ozone into the holding tank. Ozone is capable of degrading most organic compounds to water, carbon dioxide and other harmless products. A system producing about one-half kilogram of ozone per day should be sufficient for handling an occasional overload of the system with pesticides or use of a particularly persistent pesticide having a degradation half life of more than a couple of weeks.

It is preferred to employ a biological assay of the toxicity level of the effluent from the sample tank, holding tank, soil bed reactor and the like. A bioassay technique has been provided which is quick, accurate, inexpensive and applicable for a broad variety of toxic materials. What it does is provide information on whether the effluent being tested is either toxic or non-toxic to sensitive organisms without necessarily identifying which toxic substances may be present. Broadly the technique provides for exposure of standardized bioassay animals to the effluent water and observing mortality.

A preferred organism for the bioassay is the gammarid crustacean *Hyalella azteca*. *Hyalella azteca* is a freshwater amphipod which is, as are most aquatic crustaceans, highly sensitive to water-born toxins. They readily reproduce under artificial conditions and require very little attention to maintain a healthy population. They are preferentially herbiverous and are especially fond of the fine root hairs of water hyacinths, *Eichhornia crassipes*.

A *Hyalella azteca* colony is preferably raised in a plurality of small (e.g. 100 to 125 liter) glass aquaria as a back-up for accidental decimation of a population. Each aquarium is provided with an under gravel filter and aerator. The surface of the water is covered with water hyacinths and about 500 animals may be readily maintained in each such aquarium. Up to 10% of the population may be removed weekly without harm to the population. In the event of over population the food supply may be restricted for suppressing reproduction, or excess animals may be removed and disposed of.

Growth of the water hyacinths is maintained by overhead florescent growth lamps and the aquaria are simply kept at room temperature. In the event growth of water hyacinths in the aquaria is not sufficient for maintaining a desired population of *Hyalella azteca*, plants may be removed from time to time and replaced with water hyacinths grown in separate tanks. Plants so harvested may be composted or disposed of in the soil bed reactor.

To perform a bioassay, approximately one liter of effluent is placed in each of a pair of shallow glass dishes. For each test four such dishes are used, two test dishes containing sampled effluent and two control dishes. Each control dish contains approximately one liter o ordinary tap water which has been aged with aeration to avoid thermal shock or chlorine toxicity. Ten adult or sub-adult *Hyalella azteca* are removed from the aquaria and counted into each dish. A small piece of lettuce (about 25 square centimeters) or similar green plant is placed in each dish for food. It is preferable to cultivate the lettuce specifically for the bioassay laboratory so that it can be certain that it has not been treated at any time before with pesticides. Each dish is equipped with an aerating sparger, covered with a watch glass, and placed on a lighted test rack.

Twenty four hours after stocking the dishes with animals, an accurate count is made of the present population of each dish. Each animal is removed from the dish with a small eye dropper or pipette and placed in the watch glass cover. The population number and relative activity level are recorded. The lettuce is removed and replaced with a new piece and surviving animals are returned to the dish after counting. The counting procedure is repeated for a number of days corresponding to the type of pesticide potentially present in the water. Two days is sufficient for some pesticides such as cypermethrin or permethrin, while four days may be more appropriate for pesticides such as Dichlorvos or Naled.

The approximate toxicity level of the water in the test dishes is calculated by comparison of mortality with mortality observed with predetermined levels of toxicity. The calibration comprises routine determination of the 50% lethal concentration ($LC_{50}$) value for the strain of *Hyalella azteca* strain being used. Once the $LC_{50}$ value has been determined, the number of observed mortalities in the bioassay procedure is used to back calculate an approximate toxicity level in the water. The $LC_{50}$ level can be determined for a variety of pesticides and should be checked from time to time in the event of changes in the population of *Hyalella azteca*.

The bioassay derived data for toxicity should also be periodically checked by routine analytical procedures suitable for the pesticides which may be present in the water. Sensitivity in the parts per billion range is required due to the sensitivity of the bioassay animals to low concentrations of toxic materials. A gas chromatography system with either an electron capture detector or flame photometric detector is the technique of choice since it is relatively simple to operate by a qualified operator and sufficiently sensitive. Such techniques are also consistent with present federally-mandated EPA methods for analysis of many pesticides. Other conventional analytical techniques presently available or developed from time to time may be used for verifying the animal bioassay technique with observed mortality of sensitive amphipods.

A sump receives waste water from the assay laboratory. This may include water withdrawn from the sample tank, holding tank, etc., for purging lines before samples are taken, water from assay test dishes, or other wastes which may contain pesticides. Water from the assay laboratory sump is intermittently returned to the holding tank.

It will be realized from this description that a technique has been provided for on-site destruction of pesticide waste, both liquid and gaseous, generated during treatment of plants in a greenhouse or the like. Such a system may be used for other sources of dilute, gaseous and liquid waste streams such as may be generated from decontaminating or fumigating containers or vehicles. The use of soil microorganisms to degrade such wastes is not uncommon; however, the system hereinabove described may be used for destroying gaseous as well as liquid wastes.

It will be readily appreciated that the system described is exemplary and its operation may be modified from time to time. Thus, for example, if a bioassay demonstrates that the water in a sample tank is largely free of toxic materials, that water may be sent directly to the pond or the soil bed reactor without commingling with water containing appreciable amounts of pesticide. Such by-pass lines and the like have been omitted from the drawing for clarity.

Although a stand alone system with sample piping to an assay laboratory has been described, it will be apparent that manual sampling of waste solutions by simple dipping may be suitable, and that samples may be exported to an off-site laboratory which provides assay services for a number of facilities and operations. Further, instead of using a bioassay technique as described herein, conventional precision analytical techniques may be used for assaying levels of toxic materials in the various solutions.

Many other modifications and variations will be apparent to those skilled in the art and it will therefore be understood that within the scope of the appended claims the invention may be practiced otherwise than as specifically described.

What is claimed is:

1. A method for decontaminating dilute aqueous solutions containing toxic wastes comprising the steps of:
   introducing a batch of solution into a holding tank;
   sparging air into the solution while in the holding tank;
   passing air vented from at least the holding tank through a soil bed reactor for microbial degradation of volatile toxic wastes;
   assaying solution in the holding tank for presence of toxic wastes and passing solution from the holding tank containing toxic wastes through a soil bed reactor for microbial degradation of toxic wastes; and
   discharging solution substantially free of toxic wastes from the soil bed reactor to a waste water disposal system.

2. A method as recited in claim 1 further comprising the step of discharging solution shown by the assaying step to be substantially free of toxic wastes from the holding tank to a waste water disposal system.

3. A method as recited in claim 1 further comprising the step of temporarily diverting air from the holding tank through a chemical filter for removing toxic wastes.

4. A method as recited in claim 3 wherein the chemical filter comprises activated charcoal, and further comprising the step of mixing such activated charcoal when it is spent into a soil bed reactor for removing toxic wastes from the charcoal.

5. A method as recited in claim 1 comprising passing air containing toxic wastes and solution from the holding tank through the same soil bed reactor.

6. A method as recited in claim 5 comprising passing air upwardly through the soil bed reactor, passing solution from the holding tank downwardly through the soil bed reactor, and introducing the solution below the top surface of the soil bed reactor.

7. A method as recited in claim 1 further comprising cultivating a photosynthetic crop on the soil bed reactor.

8. A method as recited in claim 1 further comprising cultivating alfalfa on the soil bed reactor.

9. A method as recited in claim 1 wherein the assaying step comprises conducting a bioassay of the solution for determining approximate toxicity without identifying specific toxic materials in the solution.

10. A method as recited in claim 1 wherein the assaying steps comprising conducting a bioassay of the respective waste water solutions for determining approximate toxicity without identifying specific toxic materials in the waste water.

11. A method as recited in claim 1 further comprising the steps of:
    directing a batch of solution to a sample tank;
    assaying the batch of solution for presence of toxic wastes;
    transferring a batch of solution containing toxic wastes from the sample tank to the holding tank;
    aerating the solution while in the sample tank; and
    passing air vented from the sample tank through a soil bed reactor for microbial degradation of volatile toxic wastes.

12. A method of detoxifying effluents containing toxic wastes from a greenhouse comprising the steps of:
    transferring rinse water containing toxic wastes from the greenhouse to a holding tank;
    aerating the rinse water while in the holding tank;
    passing air vented from the holding tank through a soil bed reactor for microbial degradation of volatile toxic wastes;
    passing waste water containing toxic wastes from the holding tank through a soil bed reactor for microbial degradation of toxic wastes;
    discharging waste water substantially free of toxic wastes from the soil bed reactor to a waste water disposal system; and
    intermittently passing air containing toxic wastes from the greenhouse through a soil bed reactor for microbial degradation of toxic wastes.

13. A method as recited in claim 12 further comprising the steps of:
    directing a batch of rinse water from the greenhouse to a sample tank;
    assaying the batch of rinse water for presence of toxic wastes; and
    transferring a batch of rinse water shown by the assaying step to contain toxic wastes from the sample tank to the holding tank.

14. A method as recited in claim 12 further comprising the step of temporarily diverting air from the holding tank through a chemical filter for removing toxic wastes while air from the greenhouse is being passed through the soil bed reactor.

15. A method as recited in claim 14 wherein the chemical filter comprises activated charcoal and further comprising the step of mixing such activated charcoal when it is spent into the soil bed reactor for removing toxic wastes from the spent charcoal.

16. A method as recited in claim 12 comprising passing air upwardly through the soil bed reactor, passing waste water from the holding tank downwardly through the soil bed reactor, and introducing the waste water below the top surface of the soil bed reactor.

* * * * *